United States Patent
Nakamura

[11] Patent Number: 6,104,976
[45] Date of Patent: Aug. 15, 2000

[54] VEHICLE SPEED CONTROL SYSTEM

[75] Inventor: Hideo Nakamura, Tokyo, Japan

[73] Assignee: Nissan Motor Co., Ltd., Kanagawa, Japan

[21] Appl. No.: 09/144,083

[22] Filed: Aug. 31, 1998

[30] Foreign Application Priority Data

Sep. 1, 1997 [JP] Japan ................................. 9-235958

[51] Int. Cl.⁷ ................................................ B60T 31/00
[52] U.S. Cl. ................................. 701/95; 701/84; 701/85; 701/86; 701/87; 701/54; 180/170; 180/179; 477/107; 477/110; 477/115; 477/118
[58] Field of Search ................................. 701/95, 83–87, 701/90, 93, 54; 180/170, 179; 477/107, 115, 118, 110

[56] References Cited

U.S. PATENT DOCUMENTS

| | | | |
|---|---|---|---|
| 4,939,656 | 7/1990 | Hoashi et al. | 701/84 |
| 5,033,571 | 7/1991 | Morimoto | 701/95 |
| 5,197,564 | 3/1993 | Nishimura et al. | 701/94 |
| 5,758,306 | 5/1998 | Nakamura | 701/95 |

FOREIGN PATENT DOCUMENTS 61-232927  10/1986  Japan .

OTHER PUBLICATIONS

"Control Algorithms for DBW", S. Morita, Jidoshagijutsu gakkai–shi, vol. 48, No. 10, 1994, pp. 13–19.

*Primary Examiner*—William A. Cuchlinski, Jr.
*Assistant Examiner*—Yonel Beaulieu
*Attorney, Agent, or Firm*—McDermott, Will & Emery

[57] ABSTRACT

A vehicle speed control system comprises a section for calculating a command driving force-required to make a sensed vehicle speed equal to a preset command vehicle speed, a section for calculating a command engine output in accordance with the command driving force and the command vehicle speed, a section for calculating a command engine speed corresponding to the command engine output from a predetermined engine torque-versus-speed characteristic relationship in an engine constraint state of minimum throttle setting and fuel cutoff inhibition when the command driving. force is negative, and a section for calculating a command transmission ratio in accordance with the command engine speed. When the driving force command is negative, the control system put the engine in the constraint state and controls a continuously variable transmission in response to the command transmission ratio so as to prevent undesired vehicle speed hunting.

19 Claims, 11 Drawing Sheets

VEHICLE
SPEED

CHANGEOVER OF ENGINE
OPERATING CONDITION

FIG.16

VEHICLE SPEED CONTROL SYSTEM

BACKGROUND OF THE INVENTION

The present invention relates to system and method for controlling a vehicle running speed to a preset target speed, and more specifically vehicle speed control system and method for a vehicle equipped with a continuously variable transmission.

Figure 12:
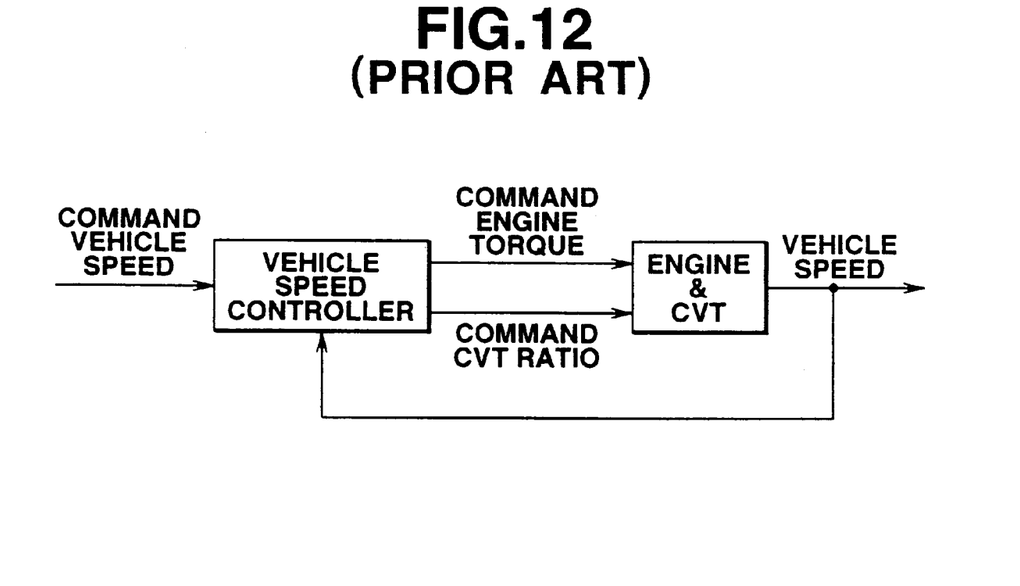
FIG. 12 is a block diagram showing a conventional vehicle speed control system.

A vehicle speed control system of one conventional example as shown in FIG. 12 for a vehicle equipped with a continuously variable transmission is arranged to control only the throttle opening when a vehicle speed deviation is smaller than a predetermined value, and to control only the transmission ratio when the vehicle speed deviation is greater than the predetermined value (as disclosed, for example, in Japanese Patent (Kokai) Publication 61(1986)-232927). This system does not control both inputs, the throttle opening and the transmission ratio, simultaneously.

In another example for a vehicle equipped with a continuously variable transmission, a control algorithm (as disclosed in Shigeyuki Morita, "Control Algorithm for DBW", Jidoshagijutsu gakkai-shi", Vol. 48, No. 10, 1994) is designed to control the throttle opening and the transmission ratio by finding a pair of engine torque value and transmission ratio value to achieve an optimum fuel consumption, among pairs of engine torque and transmission ratio to achieve a driving force required to maintain a preset command vehicle speed value. This control system achieves the command vehicle speed value by controlling both inputs, the throttle opening and the transmission ratio.

SUMMARY OF THE INVENTION

It is an object of the present invention to provide vehicle speed control system and method for providing stable control performance especially during a running operation on a downgrade or a decelerating operation.

Figure 13:
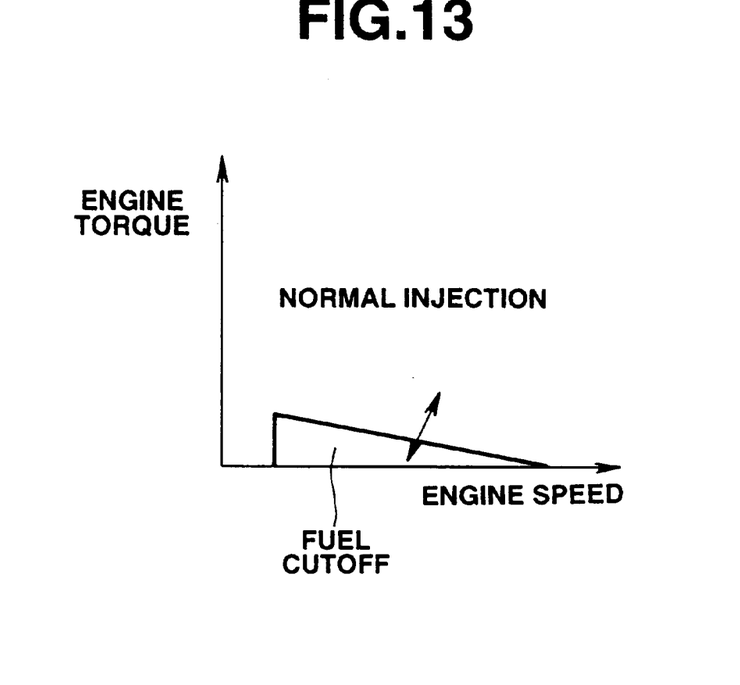
FIG. 13 is a graph showing a fuel cutoff region and a normal injection region in the conventional system.
Figure 14:
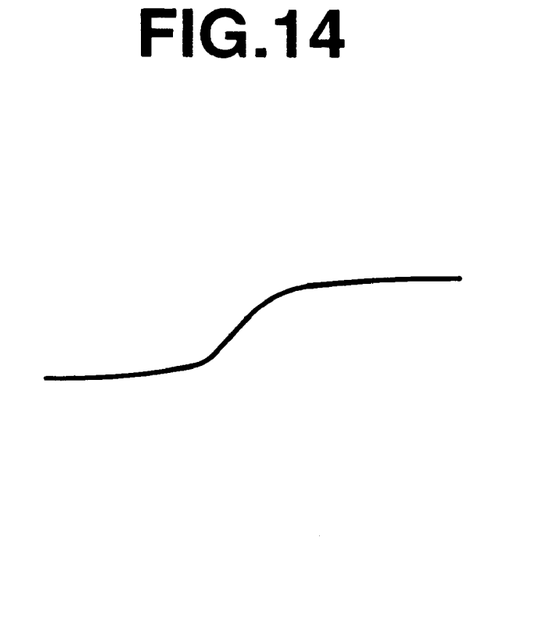
FIG. 14 is a graph showing a waveform of an engine torque variation caused by a changeover between the engine fuel cutoff and recovery in the convention system.
Figure 15:
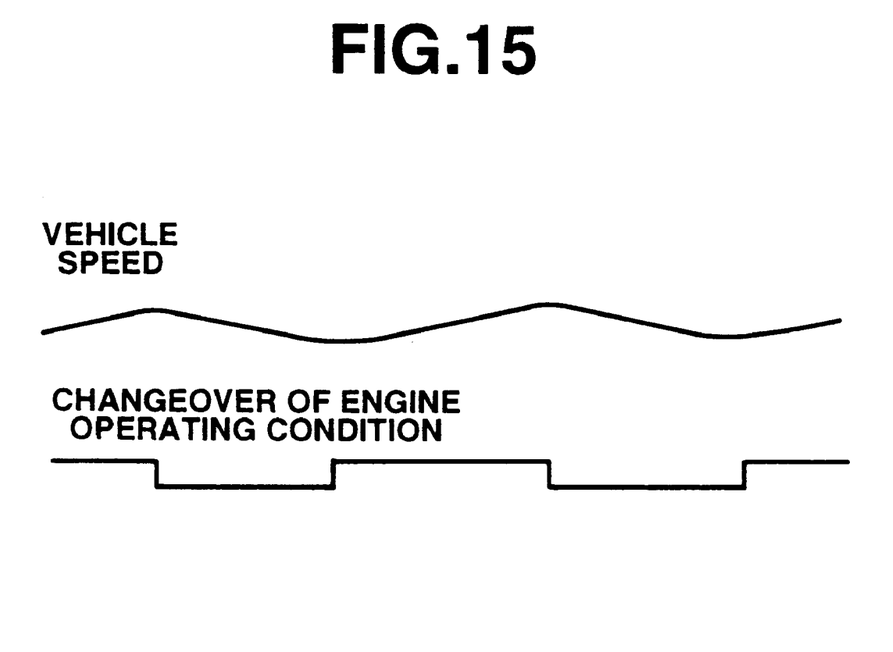
FIG. 15 is a view for illustrating vehicle speed hunting in the conventional system.

In the conventional vehicle speed control system of the above-mentioned former example, hunting of engine fuel cutoff and recovery can occur and cause a fluctuation of the vehicle speed in a constant vehicle speed control mode on a downward slope or a deceleration control mode. A negative engine torque required to make the actual vehicle speed equal to a command vehicle speed value in such a situation can fall on an engine operating point for performing a changeover of fuel cutoff and recovery, as shown in FIG. 13, resulting in a change in the engine torque as shown in FIG. 14. Therefore, the system becomes unable to attain the required negative engine torque smoothly and tends to suffer hunting in the vehicle speed as shown in FIG. 15. When the engine operating condition remains near a changeover point because of a relation between the command vehicle speed and the running resistance, the engine operating condition is changed over repeatedly and the vehicle speed oscillates as shown in FIG. 15.

The vehicle speed control system of the latter example can control the throttle opening and the transmission ratio along an optimum fuel consumption line tracing tangent points between constant fuel consumption curves and constant output curves. However, this control strategy is inapplicable when the required driving force is negative.

The vehicle speed control system or method according to the present invention is devised to provide a more stable control performance exempt from undesired vehicle speed hunting.

According to the present invention, a vehicle speed control system or method comprises:

a speed setting section for setting a command vehicle speed;

a vehicle speed sensing section for sensing an actual vehicle speed;

a controlling section for calculating a command driving force required to make the actual vehicle speed equal to the command vehicle speed, and for calculating a command engine torque and a command transmission ratio to achieve the command driving force;

an engine controlling section for controlling an engine in response to the command engine torque; and a transmission controlling section for controlling a continuously variable transmission in response to the command transmission ratio.

The controlling section may comprise:

a driving force calculating section for calculating the command driving force required to make the actual vehicle speed equal to the command vehicle speed;

an engine output calculating section for calculating an command engine output in accordance with the command driving force and the command vehicle speed;

an engine speed calculating section for calculating a command engine speed corresponding to the command engine output, from a predetermined engine torque-versus-speed characteristic relationship in an engine constraint state in which a throttle is fully closed and fuel cutoff is inhibited, when the command driving force is negative; and a transmission ratio calculating section for calculating a command transmission ratio in accordance with the command engine speed.

When the command driving force is negative, the engine is put in the constraint state for fully closing the throttle valve for the engine and inhibiting the fuel cutoff operation whereas the continuously variable transmission is controlled in accordance with the command transmission ratio. Therefore, even in a situation of deceleration or coasting along a downgrade, the desired command vehicle speed can be sustained in a stable manner free from hunting.

DETAILED DESCRIPTION OF THE INVENTION

Figure 1:
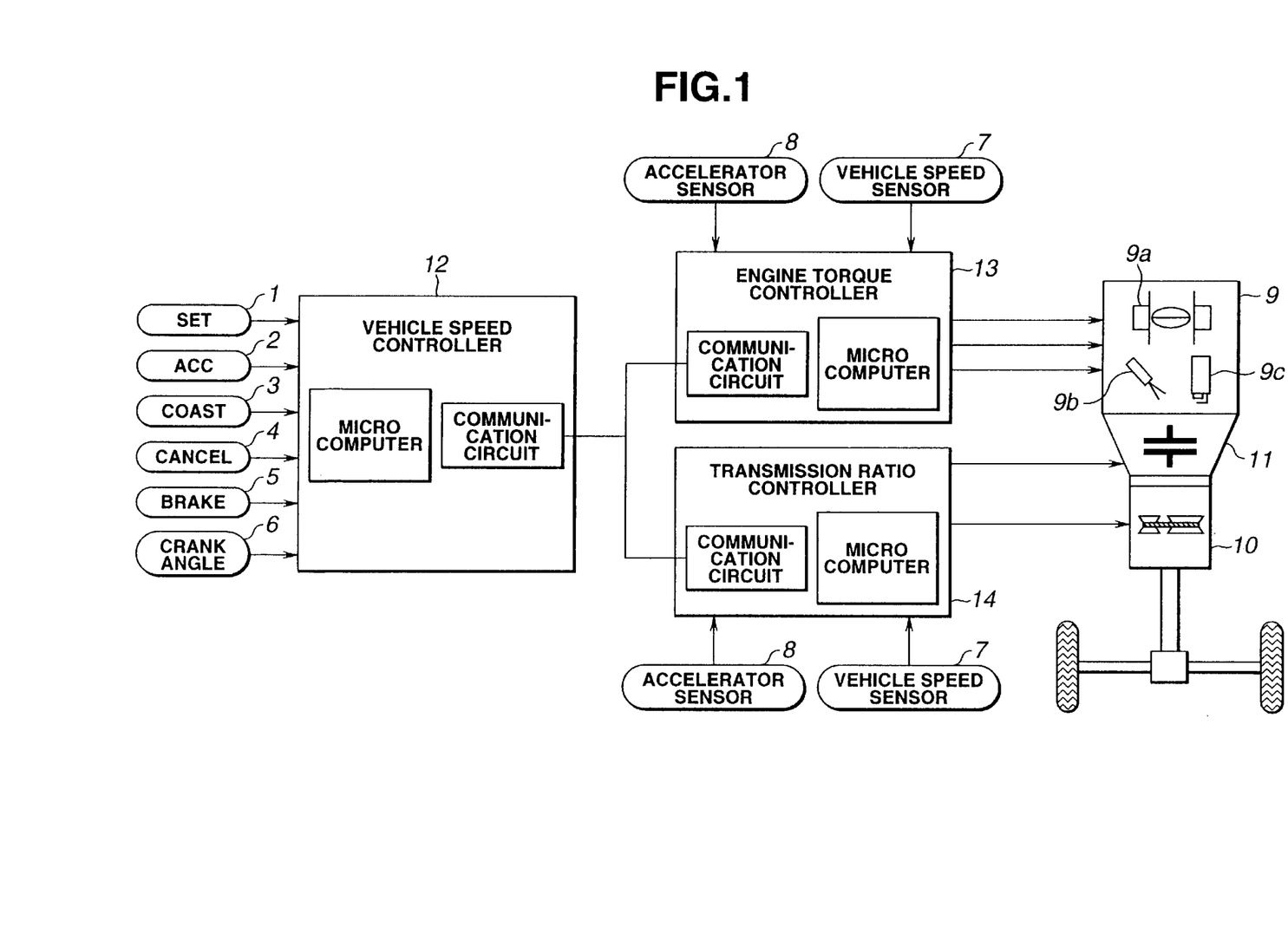
FIG. 1 is a schematic view showing a vehicle equipped with a vehicle speed control system according to one embodiment of the present invention.

FIG. 1 shows a vehicle speed control system according to one embodiment of the present invention.

A set switch 1 is an input device for setting a current vehicle speed as a target command vehicle speed (or a vehicle speed command value) and for initiating an automatic vehicle speed control. An accelerate switch 2 is an input device for increasing the preset target command vehicle speed. A coast switch 3 is an input device for decreasing the preset target command vehicle speed. A cancel switch 4 is an input device for canceling the automatic speed control. With these switches, the driver of the vehicle can input driver's commands into the control system. A brake switch 5 is an input device actuated when a brake pedal of the vehicle is operated by the driver of the vehicle. The automatic speed control is canceled when the brake switch 5 is actuated, as well as when the cancel switch 4 is operated.

A crank angle sensor 6 produces a pulse signal in the form of a pulse train having a period corresponding to an engine revolution speed. A vehicle speed sensor 7 produces a pulse signal in the form of a pulse train of a period corresponding to a vehicle speed. The control system can determining the engine speed and the vehicle speed by measuring the pulse spacings (or the pulse separations) of these pulse signals. An accelerator sensor 8 senses a depression degree of an accelerator pedal, as driver's accelerating intention. This quantity is used in a normal control when the automatic speed control is canceled.

Figure 2:
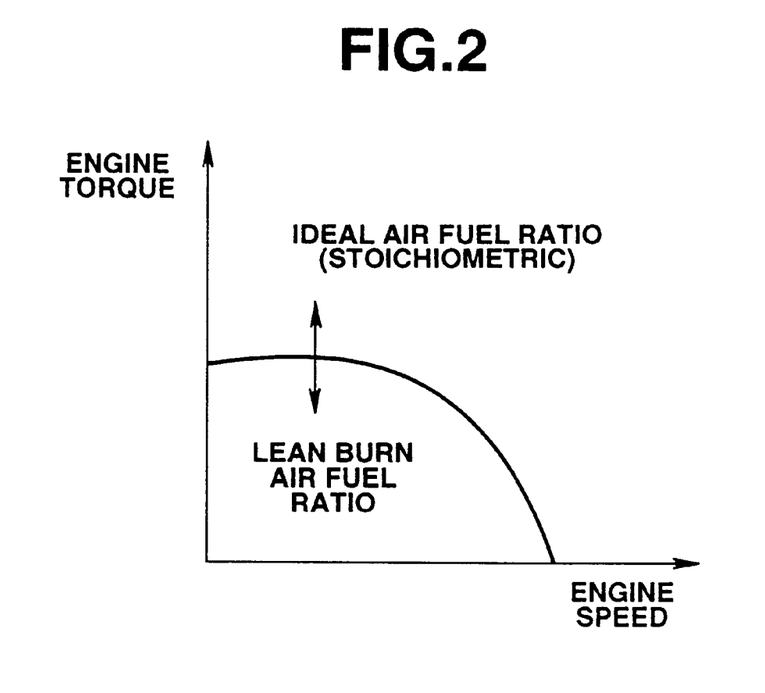
FIG. 2 is a graph showing engine operating regions for stoichiometric combustion mode and lean combustion mode for an engine shown in FIG. 1.
Figure 3:
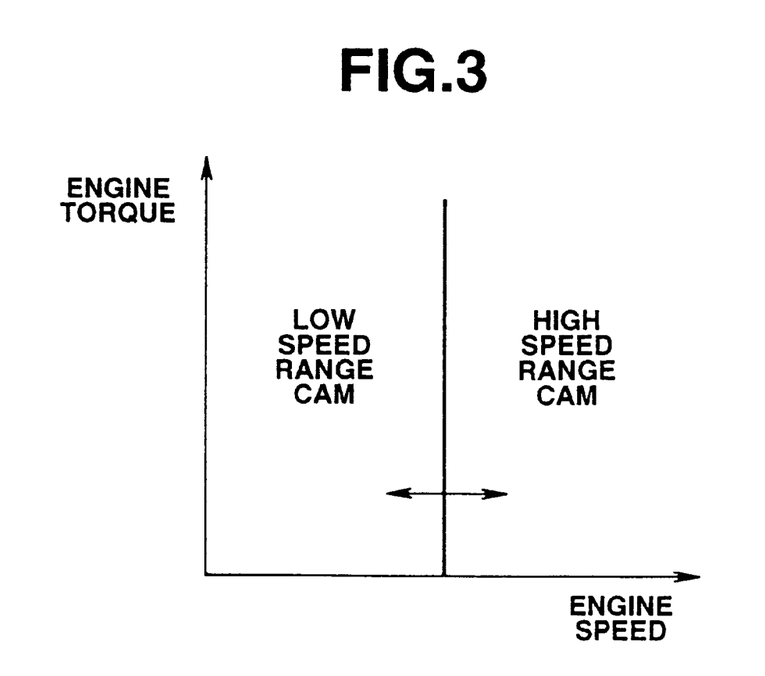
FIG. 3 is a graph showing engine operating regions for low engine speed range cam and high engine speed range cam for the engine of FIG. 1.

A lean burn engine 9 is controlled so as to make an engine torque equal to a desired target command torque (or torque command value) by an intake air quantity control by a throttle actuator 9a, a fuel injection control by at least one fuel injector 9b and an ignition timing control by at least one spark plug 9c. In the lean burn engine 9 of this example, an engine operating mode is changed over between a first mode of a stoichiometric air fuel ratio and a second mode of a lean air fuel ratio in accordance with engine operating conditions as shown in FIG. 2. Moreover, a valve timing control mode for controlling the opening and closing timings of intake and exhaust valves of the engine 9 is changed over discontinuously between a low engine speed mode with a low speed cam for low engine speeds and a high engine speed mode with a high speed cam for high engine speeds, in accordance with engine operating conditions, as shown in FIG. 3. Furthermore, the engine 9 is switched between a fuel cutoff mode and a normal injection (or recovery) mode in accordance with engine operating conditions as shown in FIG. 13. The engine operation is changed discontinuously by these changeover operations.

A continuously variable transmission (CVT) 10 of this example is of a belt type, and has a primary pulley, a secondary pulley and a hydraulic system for varying the radii of the pulleys by an oil pressure control so as to make a transmission ratio (or speed ratio or pulley ratio) of the transmission 10 equal to a target command transmission ratio (or a transmission ratio command value). The belt type continuously variable transmission 10 of this example has a torque converter equipped with a lockup clutch for starting operation.

A vehicle speed controller 12, an engine torque controller 13 and a transmission ratio controller 14 share information through communication circuits. In this example, each of the controllers 12, 13 and 14 has at least one microcomputer, one or more peripheral devices and one or more driver circuits for driving various actuators.

The vehicle speed controller 12 performs control operations for setting and changing the target command vehicle speed (or vehicle speed command value) and calculations of target command engine torque (or engine torque command value) and target command transmission ratio (or transmission ratio command value). The engine torque controller 13 performs engine control operations for controlling the throttle opening of the throttle valve in response to the command engine torque, and for changing the air fuel ratio, the intake and exhaust valve opening and closing timings and the fuel cutoff and recovery state. The transmission ratio controller 14 controls the transmission ratio (or speed ratio) of the continuously variable transmission 10 in response to the target command transmission ratio.

Figure 4:
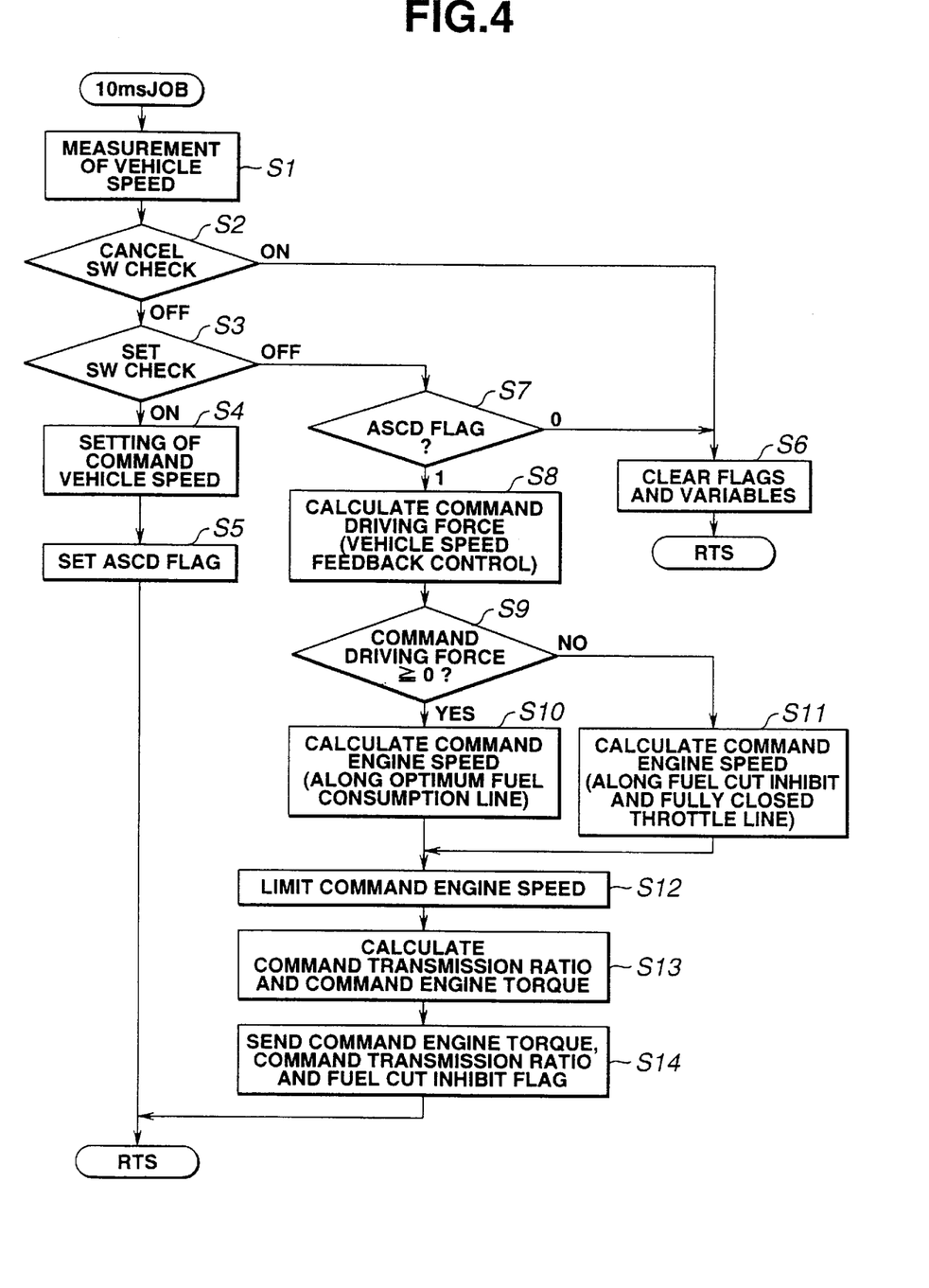
FIG. 4 is a flow chart of a vehicle speed control program performed by the control system of FIG. 1.

FIG. 4 shows a vehicle speed control program. The vehicle speed controller 12 executes the vehicle speed control program at regular time intervals of 10 msec.

At a step S1, an actual vehicle speed Vsp is measured with the vehicle speed sensor 7. The vehicle speed controller 12 reads the actual vehicle speed Vsp sensed by the vehicle speed sensor 7.

At a step S2, the speed controller 12 checks whether the automatic vehicle speed is canceled or not, by checking whether the cancel switch 4 or the brake switch 5 is in the on state or not.

A step S6 is reached if the automatic speed control is in the canceled state or off state. The speed controller 12 initializes various control flags and control parameters at the step S6 and terminates the automatic vehicle speed control program.

A step S3 is reached if the automatic speed control is not in the canceled state, but in the on state. At the step S3, the speed controller 12 checks whether or not the set switch 1 is operated. When the set switch 1 is operated and in an on state, the speed controller 12 proceeds from the step S3 to a step S4 to start the automatic vehicle speed control. At the step S4, the speed controller 12 sets and stores the current actual vehicle speed Vsp as a target command vehicle speed (or vehicle speed command value) Vspr. The target command vehicle speed Vspr is set equal to the (then-existing) current actual vehicle speed Vsp. Then, at a next step S5, the speed controller 12 sets an ASCD (auto speed control device) operation flag to indicate that the automatic speed control is in operation, and terminates the program for the present.

When the set switch 1 is not operated and hence in an off state, the speed controller 12 proceeds from the step S3 to a step S7, and confirms, at the step S7, whether the automatic speed control is in operation, by checking the ASCD flag. From the step S7, the speed controller 12 proceeds to the step S6 for initialization and then terminates the program if the automatic vehicle speed control is out of operation. If the automatic vehicle speed control is on, the speed controller 12 proceeds to a step S8, and calculates a final target command driving force (or final driving force command value) y1 to make the actual vehicle speed Vsp equal to the target command vehicle speed Vspr.

In this example, the speed controller 12 calculates the final target command driving force y1 in the following manner.

Figure 5:
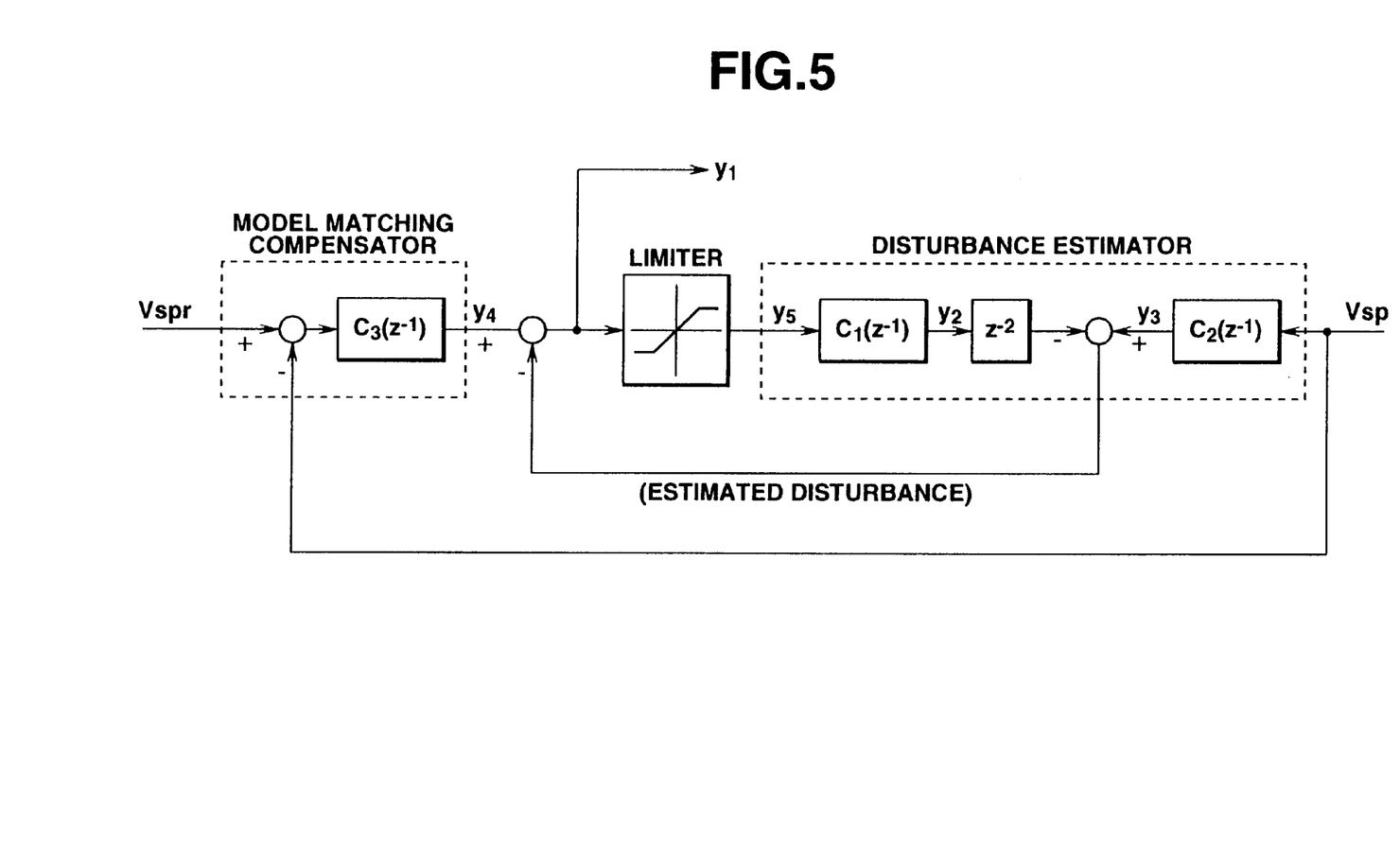
FIG. 5 is a block diagram showing a system of a model matching compensator and a disturbance estimator, employed in the control system of FIG. 1 to calculate a command driving force.
Figure 6:
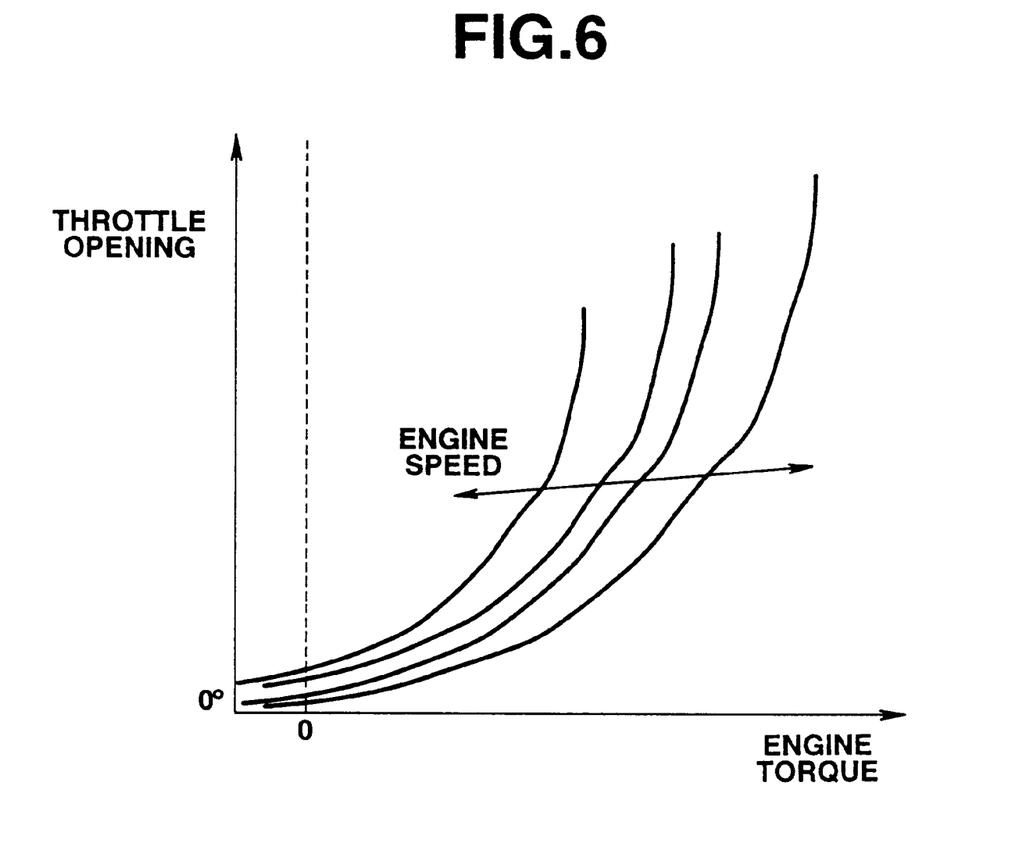
FIG. 6 is a graph showing an engine nonlinear steady state characteristic map used in the control system of FIG. 1.

This calculation employs a feedback vehicle speed compensator based on the linear control techniques of model matching, and of zeroing (robust control method), as shown in FIG. 5. A vehicle model of the controlled system is incorporated in the feedback vehicle speed compensator. In this vehicle mode, by modeling with a target driving force as a manipulated variable, and the vehicle speed as a controlled variable, it is possible to omit transient characteristics of the engine and torque converters having relatively high response speeds, and nonlinear steady state characteristic of the torque converter. It is further possible to linearize an engine nonlinear steady state characteristic by calculating a command throttle opening (or throttle opening command value) required to make an actual driving force equal to a target command driving force by the use of an engine nonlinear steady state characteristic map as shown in FIG. 6, obtained by preliminary measurement, and by servo-controlling the throttle opening. Therefore, the vehicle model with the target command driving force as an input and the vehicle speed as an output is a model having an integral characteristic. In the compensator, it is possible to use a pulse transfer function $P(z^{-1})$ as the transfer characteristic of this vehicle model.

Figure 7:
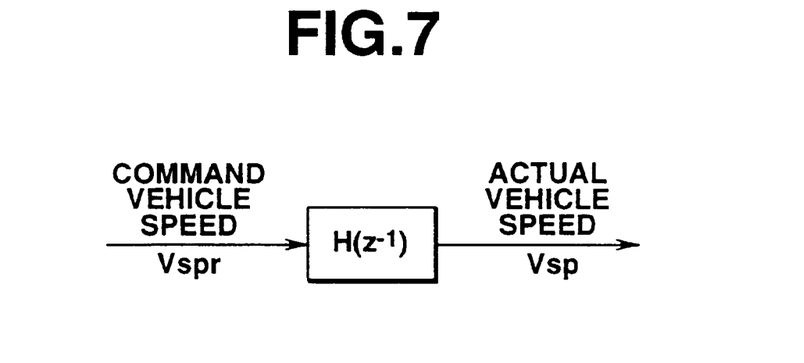
FIG. 7 is a block diagram showing a reference model of a controlled system used in the control system of FIG. 1.

In FIG. 5, z is a delay operator, and multiplication by $z^{-1}$ provides an old value at a previous time earlier by one sampling period. $C1(z^{-1})$ and $C2(z^{-1})$ form a disturbance estimator based on the technique of zeroing, for restraining influence of disturbance and modeling error. $C3(z^{-1})$ is a compensator based on the technique of model matching, for making a response characteristic of the controlled system receiving the command vehicle speed Vspr as an input and producing the actual vehicle speed Vsp as an output, as shown in FIG. 7, equal to a characteristic of a predetermined reference model $H(z^{-1})$ having a first order lag and a dead time element.

In the transfer characteristic of the controlled system, it is necessary to take account of a dead time due to a delay in the power train. A pulse transfer function $P(z^{-1})$ of the controlled system receiving the command driving force as an input and producing the actual vehicle speed as an output can be expressed as a product of an integral element $P1(z^{-1})$ and a dead time element $P2(z^{-1})$ ($=z^{-n}$). The integral element $P1(z^{-1})$ is expressed as;

[Math. Expression 1]

$$P1(z^{-1})=T\cdot z^{-1}/\{M\cdot(1-z^{-1})\}$$

In this equation, T is the sampling period (which is equal to 10 msec in this example), and M is a mean vehicle weight.

In this case, the compensator $C1(z^{-1})$ is expressed as;

[Math. Expression 2]

$$C1(z^{-1})=(1-\gamma)\cdot z^{-1}/(1-\gamma\cdot z^{-1}),$$

$$\gamma=\exp(-T/Tb)$$

That is, the compensator $C1(z^{-1})$ is a low pass filter of a time constant Tb.

The compensator $C2(z^{-1})$ is expressed, as C1/P1, by the following equation.

[Math. Expression 3]

$$C2(z^{-1})=M\cdot(1-\gamma)\cdot(1-z^{-1})/\{T\cdot(1-\gamma\cdot z^{-1})\}$$

The compensator C2 is in the form of multiplication of an inverse system of the vehicle model by the low pass filter. By inputting the actual vehicle speed Vsp into this compensator $C2(z^{-1})$, it is possible to calculate, in a reverse manner, a driving force corresponding to the actual vehicle speed Vsp, that is a driving force resulting from subtraction of disturbance such as a running resistance, from a driving force of the power train.

By neglecting a dead time in the controlled system and using the reference model $H(z^{-1})$ in the form of a first order low pass filter having a time constant Ta, the compensator C3 can be reduced to a constant K given as;

[Math. Expression 4]

$$C3=K=\{1-\exp(-T/Ta)\}\cdot M/T$$

Then, the calculation corresponding to the model matching compensator $C3(z^{-1})$ is performed to determine a value (command value) of a command driving force y4 required for acceleration from the actual vehicle speed Vsp to the target command vehicle speed Vspr. When data y(k) is used to represent a current driving force at an instant of current sampling and data y(k−1) is to represent a previous driving force at an instant one sampling period before the current sampling, y4(k) is given by;

[Math. Expression 5]

$$y4(k)=K\cdot\{Vspr(k)-Vsp(k)\}$$

Furthermore, the calculation in the reverse direction, corresponding to the robust compensator $C2(z^{-1})$ forming a part of the disturbance estimator shown in FIG. 5 is performed to determine the driving force corresponding to the actual vehicle speed Vsp, that is the driving force y3 resulting from subtraction of disturbance such as the running resistance, from the driving force of the power train.

[Math. Expression 6]

$$y3(k)=\gamma\cdot y3(k-1)+(1-\gamma)\cdot M\cdot\{Vsp(k)-Vsp(k-1)\}/T$$

A final target driving force y1(k) is determined by modifying the target driving force y4 with an estimated running resistance value Fr. As mentioned before, the driving force y3(k) is the driving force corresponding to the actual vehicle speed Vsp, resulting from subtraction of the disturbance such as the running resistance, from the driving force of the power train. On the other hand, the compensator C1 is a low pass filter. Therefore, the driving force y2(k) is a driving force obtained by performing the operation of the low pass filter on the target driving force y5 after the operation of a limiter. The driving force y2(k−2) obtained by multiplying the driving force y2(k) by $z^{-2}$ is an old value of the driving force y2(k) obtained two sampling periods before. This driving force y2(k−2) can be regarded as a current actual driving force of the power train affected by the delay (dead time) of the power train. Therefore, it is possible to estimate the disturbance such as the running resistance by subtraction from the current driving force y2(k−2) of the power train, of the driving force y3(k) corresponding to the actual vehicle speed. Moreover, the final target driving force y1(k) to compensate for a driving force deficit due to involvement of disturbance is determined by modification of the target driving force y4(k) by the estimated running resistance Fr.

[Math. Expression 7]

$$y1(k)=y4(k)-\{y3(k)-y2(k-2)\}=y4(k)+\{y2(k-2)-y3(k)\}$$

$$Fr=y2(k-2)-y3(k)$$

The thus-constructed disturbance estimator according to the zeroing can accurately estimate disturbance such as the running resistance of the vehicle, in accordance with a difference between the output of the model of the controlled system and the output of the actual controlled system.

Next, the final target driving force y1 is limited to a range between upper and lower limit values. First, maximum engine torque Temax and minimum engine torque Temin corresponding to the current engine speed Ne are determined by using a data table obtained by measurement of the engine torque at the fully open throttle condition and at the fully closed throttle condition for each of engine speeds. From the thus-determined maximum and minimum engine torques Temax and Temin, maximum and minimum driving forces Fmax and Fmin are determined by the following equations.

[Math. Expression 8]

$$Fmax=Temax\cdot Gmax\cdot Gf/Rt$$

$$Fmin=Temin\cdot Gmax\cdot Gf/Rt$$

In these equations, Gmax is a maximum transmission ratio of the continuously variable transmission, Gf is a final gear ratio, and Rt is an effective wheel radius.

The driving y5(k) is determined by limiting the final target driving force y1(k) between the maximum and minimum driving forces Fmax and Fmin.

[Math. Expression 9]

When y1(k)≧Fmax, then y5(k)=Fmax.

When y1(k)≦Fmin, then y5(k)=Fmin.

When Fmin <y1(k)<Fmax, then y5(k)=y1(k).

The calculation corresponding to the compensator C1(z$^{-1}$) serving as the low pass filter in the disturbance estimator is performed.

[Math. Expression 10]

$$y2(k)=\gamma\cdot y2(k-1)+(1-\gamma y)\cdot y5(k-1)$$

Finally, a command axle torque Tor is calculated from the final target driving force (command driving force) y1(k) and the effective wheel radius Rt.

[Math. Expression 11]

$$Tor=y1\cdot Rt$$

Reverting to FIG. 4, a step S9 follows the step S8. At the step S9, the speed controller 12 checks the sign of the command axle torque Tor, to determine whether Tor is equal to or greater than zero. From the step S9, the speed controller 12 proceeds to a step S10 when Tor is zero or positive, and to a step S11 when Tor is negative.

At the step S10, the speed controller 12 finds an engine operating point to achieve the positive command axle torque value Tor and an optimum fuel consumption. First, a command output L is calculated by the following equation.

[Math. Expression 12]

$$L=Tor\cdot Vspr/Rt, \text{ or } L=y1\cdot Vspr$$

Figure 8:
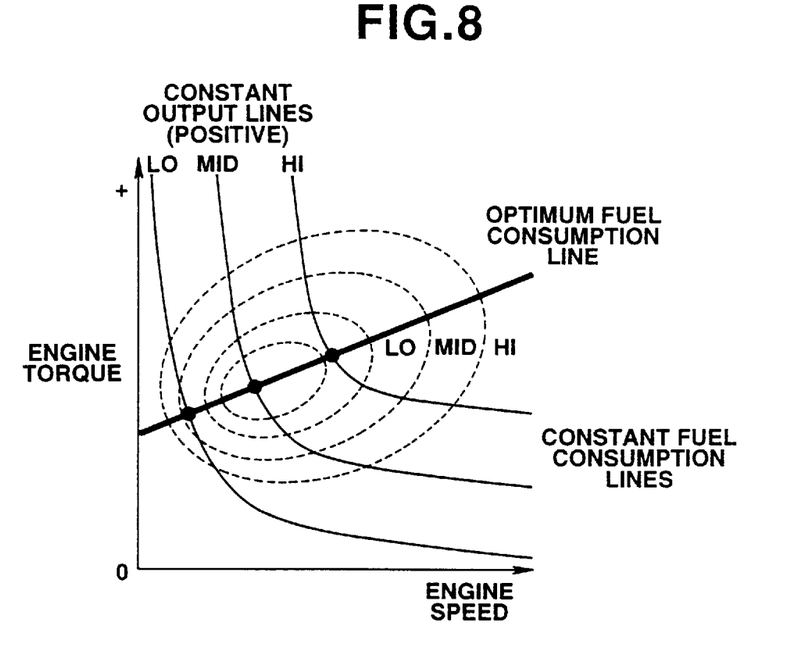
FIG. 8 is a graph showing engine characteristic lines used in the control system of FIG. 1 when a command output is positive.

Then, by using engine characteristics (constant output lines, constant fuel consumption lines and optimum fuel consumption line) as shown in FIG. 8, the speed controller 12 determines the engine operating point to achieve the (positive) command output value L and minimize the fuel consumption. This engine operating point lies on the optimum fuel consumption line connecting contact points between the constant output lines (LO (low), MID (medium), HI(high)) and the constant fuel consumption lines (LO (low), MID (medium), HI(high)). In this example, a value of a command engine speed Ner corresponding to the positive command output value L is determined by table lookup from a map of function values of the command engine speed Ner determined by intersection points between the constant output lines and the optimum fuel consumption line. Thus, the controller 12 traces the optimum fuel consumption engine operating line.

At the step S11, the speed controller 12 determines an engine operating point to achieve the negative value of the command axle torque Tor in a state in which the fuel cutoff is inhibited, and the throttle valve is fully closed.

First, the command output L is calculated by the following equation.

[Math. Expression 13]

$$L=Tor\cdot Vspr/Rt, \text{ or } L=y1\cdot Vspr$$

Figure 9:
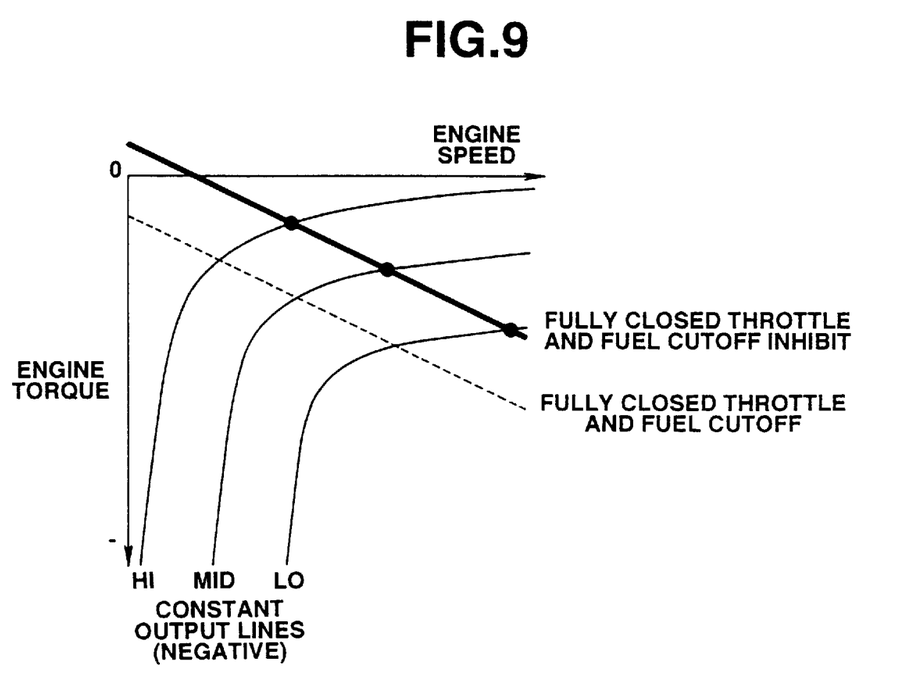
FIG. 9 is a graph showing engine characteristic lines used in the control system of FIG. 1 when the command output is negative.

Then, by using engine characteristics (constant output curves, and an engine torque line of fuel cutoff inhibition and fully closed throttle position) as shown in a graph of FIG. 9, the speed controller 12 determines the engine operating point to achieve the (negative) command output value L in the state in which the fuel cutoff is not performed and the throttle valve is fully closed. In this example, a value of the command engine speed Ner corresponding to the negative command output value L is determined by table lookup from a map of function values of the command engine speed Ner determined by intersection points between the constant output lines and the engine torque line of fuel cutoff inhibition and fully closed throttle position. Thus, the controller 12 traces the engine torque line of fuel cutoff inhibition and fully closed throttle position.

When the automatic vehicle speed control is off, the engine is operated along a characteristic line, shown by a broken line in FIG. 9, of fully closed throttle position and fuel cutoff condition.

At a step S12 following the step S10 or S11, the speed controller 12 performs an engine speed limiting operation on the command engine speed value Ter. This limiting operation is designed to limit the command engine speed within a predetermined engine speed range determined by a possible range of the transmission ratio (or speed ratio) of the continuously variable transmission 10, and by the engine itself.

At a next step S13, the speed controller 12 determines a command transmission ratio Gcvt and an command engine torque Ter by:

[Math. Expression 14]

$$Gcvt=Ner\cdot Rt/Vsp/Gf$$

$$Ter=Tor/Gcvt/Gf$$

In these equations, Gf is the final reduction ratio, and Rt is the effective tire radius.

At a step S14, the speed controller 12 sends the command engine torque Ter and a fuel cutoff inhibit flag to the engine controller 13, and sends the command transmission ratio Gcvt to the transmission ratio controller 14. Thereafter, the speed controller 12 terminates the control program of FIG. 4.

The engine controller 13 determines the throttle opening degree, from the engine speed and the command engine torque Ter, according to an engine characteristic data map stored in a memory. When the command axle torque Tor is negative, the engine controller thus controls the throttle opening in accordance with the engine speed and the command engine torque. The throttle valve is not necessarily held at the fully closed position when the command axle torque Tor is negative.

Figure 10:
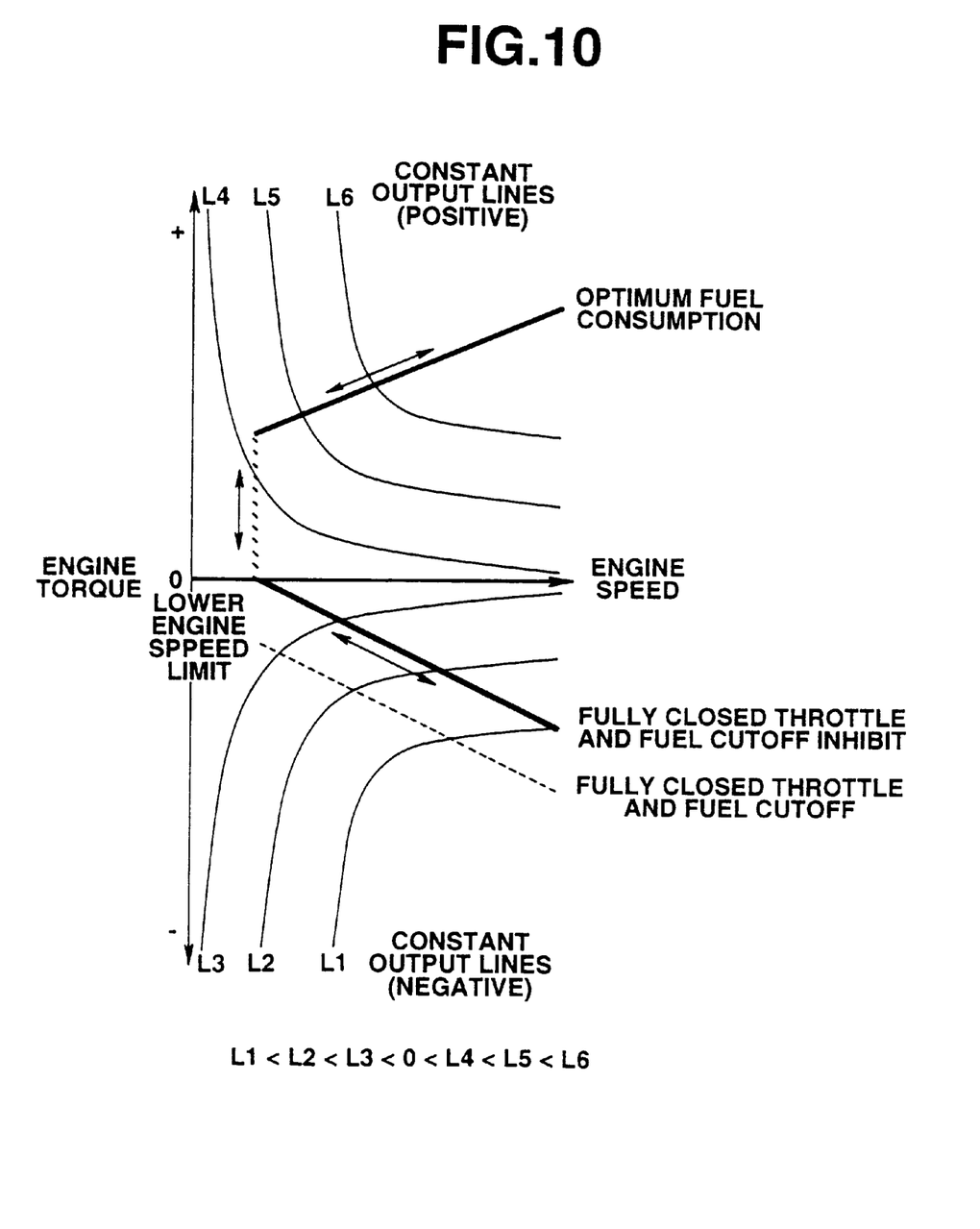
FIG. 10 is a graph illustrating a method performed by the control system of FIG. 1 in a first practical example, for distributing a command axle torque between a command engine torque and a command transmission ratio.

FIG. 10 illustrates the method of this embodiment to apportion the command axle torque Tor to make the actual vehicle speed Vsp equal to the command vehicle speed Vspr, between the command engine torque Ter and the command transmission ratio Gcvt.

When the command axle torque value Tor is positive, the control system can control the engine along the optimum fuel consumption line by determining the command engine speed value Ner from intersection points at which the optimum fuel consumption line intersects constant output lines (or equi-output lines) L4, L5, L6. When the transmission ratio reaches an upshift limit beyond which the transmission can not be shifted in the upshift direction, the engine speed is limited by the then-existing engine speed value. Therefore, the engine operation becomes unable to trace the optimum fuel consumption line, and only the command axle torque value Tor is attained.

When the command axle torque value Tor is negative, the control system determines the command engine speed value Ner from intersection points at which the minimum throttle engine torque line (in the state in which the throttle valve is fully closed and the fuel cutoff is inhibited) intersects constant output lines (or equi-output lines) L1, L2, L3. By so doing, the control system can achieve the negative command axle torque value Tor even if the fuel cutoff is inhibited by the engine controller. Without the fuel cutoff, the control system can produce a sufficient engine braking force by decreasing the intake air quantity to a level corresponding to the fully closed throttle position and by increasing the engine speed. Therefore, the control system achieves the negative command axle torque value Tor by varying the transmission ratio of the continuously variable transmission in the downshift direction.

In this way, even though the engine fuel cutoff is always inhibited, the control system can achieve required positive or negative command axle torque values continuously by varying the engine torque and the transmission ratio of the continuously variable transmission. Therefore, the control system can prevent hunting in the vehicle speed due to torque changes caused by the fuel cutoff and recovery operations.

Figure 11:
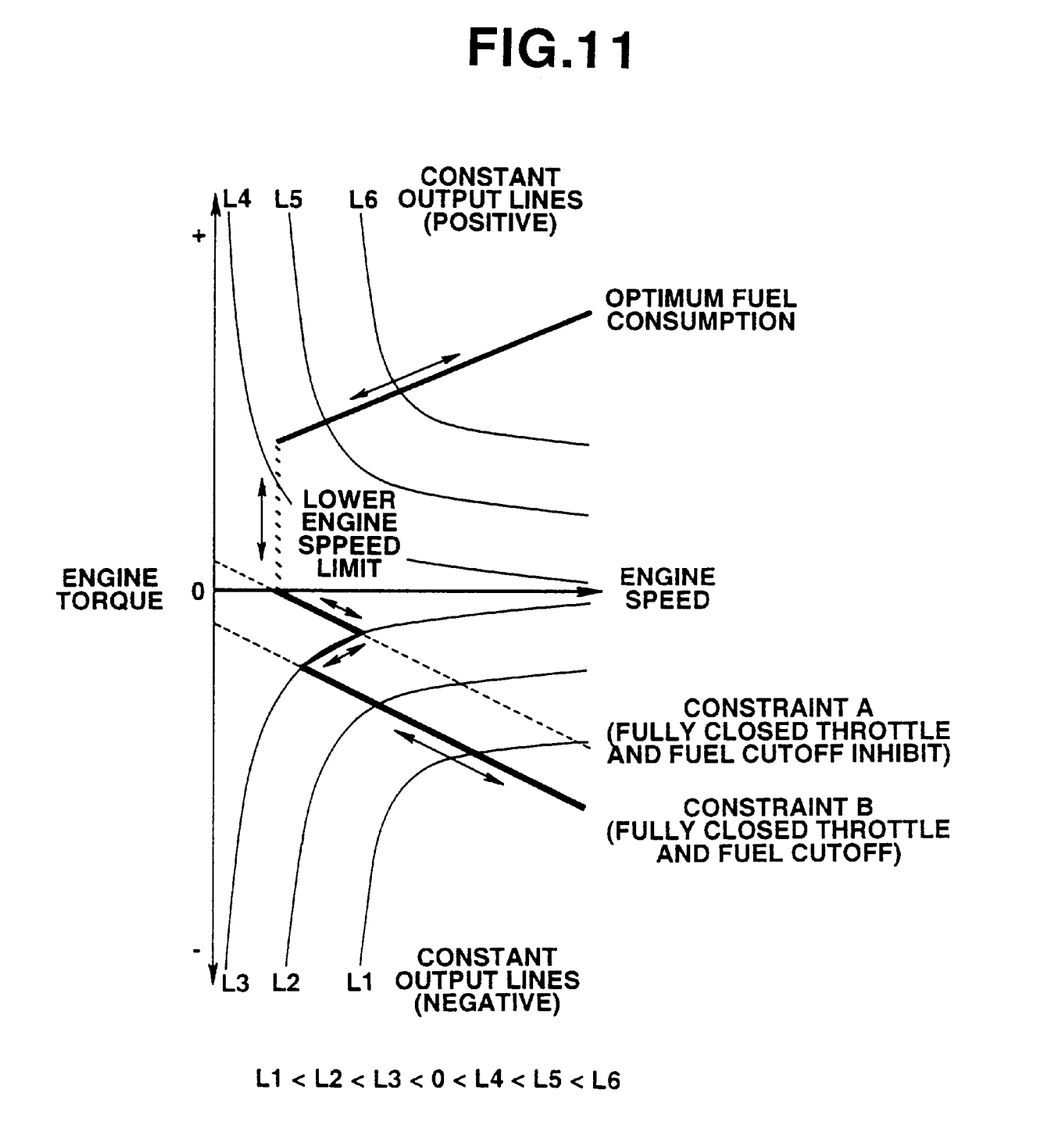
FIG. 11 is a graph illustrating a method performed by the control system of FIG. 1 in a second practical example, for distributing the command axle torque between the command engine torque and the command transmission ratio.

FIG. 11 shows a second practical example according to the embodiment of the present invention. The second practical example is almost the same as the first example, but different from the first example in the following points.

At the step S11 of FIG. 4, the speed controller 12 first calculates the command output L from the negative command axle torque value Tor.

[Math. Expression 15]

$$L = Tor \cdot Vspr/Rt$$

When the thus-determined command output value L is greater than a predetermined value L3, the speed controller 12 calculates the command engine torque value and command transmission ratio value to achieve the negative command axle toque value Tor under a constraint condition A, shown in FIG. 11, in which the throttle valve is fully closed and the fuel cutoff is prohibited. Namely, the speed controller 12 uniquely determines an engine operating point among intersection points at which constant output lines L1, L2, L3 are intersected by a constraint line A restricting the engine operation in the state of the fully closed throttle and the fuel cutoff inhibition as shown in FIG. 11.

When the command output value L is smaller than the predetermined output value L3, the speed controller 12 calculates the command engine torque and command transmission ratio to achieve the negative command axle toque value Tor under a second constraint condition B, shown in FIG. 11, in which the throttle valve is fully closed in a fuel cutoff state. The speed controller 12 uniquely determines an engine operating point among intersection points at which the constant output lines L1, L2, L3 are intersected by a constraint line B restricting the engine operation to the fully closed throttle position in the fuel cutoff state.

In the second practical example, the control system compares the command output L with a predetermined value, and changes over the engine operating mode between the first and second constraint states A and B in dependence on the result of the comparison. This control system can control the output (the driving force x the vehicle speed) always in a continuous manner. Therefore, the control system can prevent steady state hunting in the vehicle speed in spite of temporary occurrence of fuel cutoff and recovery. Moreover, the control system can widen the region of fuel cutoff, and improve the fuel consumption.

Figure 16:
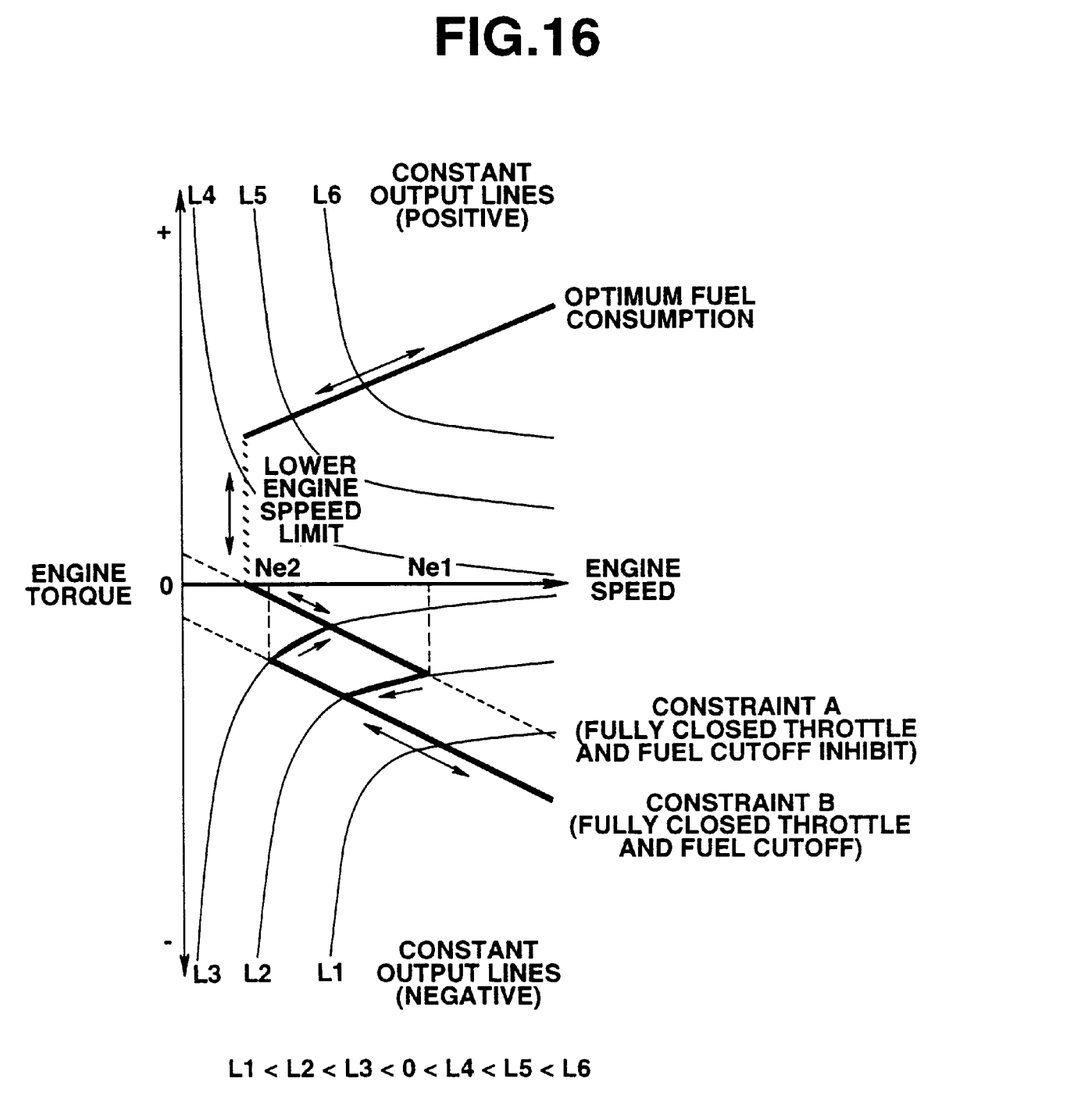
FIG. 16 is a graph illustrating a method performed by the control system of FIG. 1 in a third practical example, for distributing the command axle torque between the command engine torque and the command transmission ratio.

FIG. 16 shows a third practical example according to the embodiment of the present invention. The third example is almost the same as the preceding examples but different in the following points.

As long as the engine revolution speed is lower than a predetermined speed value Ne1, the speed controller 12 calculates, at the step S11 of FIG. 4, an engine operating point (i.e. a command engine speed value) to achieve the negative command axle toque value Tor under the first constraint condition A, shown in FIG. 16, restricting the engine operation to the state in which the throttle valve is fully closed and the fuel cutoff is prohibited.

After the engine speed becomes equal to or higher than Ne1, the vehicle speed controller 12 calculates an engine operating point (i.e. a command engine speed value) to achieve the negative command axle toque value Tor under the second constraint condition B, shown in FIG. 16, restricting the engine operation to the fully closed throttle position in the fuel cutoff state, until the engine speed becomes lower than a second predetermined speed value Ne2. The second speed value Ne2 is lower than the first speed value Ne1 by an amount for introducing hysteresis.

In accordance with the actual engine revolution speed, the control system of the third practical example switches the engine constraint condition between the first constraint condition A and the second constraint condition B. By so doing, the control system of the third practical example can reliably achieve the effects of the second practical example, even if a delay in the transmission ratio control system is significant. When the response delay in the transmission ratio control system is influential, the switching operation responsive to the command output L as in the second practical example may produce a steep change like a step change in the axle torque. The third practical example using the actually measured engine speed can avoid such an undesired torque change.

In the illustrated embodiment, the set switch 1, the accelerate switch 2 and the coast switch 3 form a section for setting command vehicle speed. The vehicle speed sensor 7 forms a section for sensing the actual vehicle speed. The vehicle speed controller 12 can serve as sections for calculating the driving force, engine output (power), engine speed, and torque/transmission ratio. The engine torque controller 13 can serve as a section for controlling the engine, and the transmission ratio controller 14 can serve as a section for controlling the transmission.

In the first practical example of FIG. 10, the fuel cutoff inhibit flag is held always in the set state to inhibit the fuel cutoff while the automatic vehicle speed (ASCD) control is in operation. In the second and third practical examples, the fuel cutoff inhibit flag is set when the constraint condition A is selected, and the fuel cutoff inhibit flag is reset to permit the fuel cutoff when the constraint condition B is selected.

The present application is based on a Japanese Patent Application No. 9-235958. The contents of the Japanese Patent Application No. 9-235958 with a filing date of Sep. 1, 1997 are hereby incorporated by reference.

What is claimed is:

1. A vehicle speed control system comprising:
   a speed setting section for setting a command vehicle speed;
   a vehicle speed sensing section for sensing an actual vehicle speed;
   a driving force calculating section for calculating a command driving force required to make the actual vehicle speed equal to the command vehicle speed;
   an engine output calculating section for calculating a command engine output in accordance with the command driving force and the command vehicle speed;
   a discriminating section for examining the command driving force to determine whether the command driving force is negative;
   a command engine speed calculating section for storing a predetermined engine torque-versus-engine-speed characteristic relationship in an engine constraint state in which a throttle is fully closed and fuel cutoff is inhibited and for calculating a command engine speed corresponding to the command engine output, from the predetermined engine torque-versus-engine-speed characteristic relationship in the engine constraint state when the command driving force is negative;
   a transmission ratio calculating section for calculating a command transmission ratio in accordance with the command engine speed;
   an engine controlling section for putting an engine in the engine constraint state when the command driving force is negative; and
   a transmission controlling section for controlling a continuously variable transmission in response to the command transmission ratio when the command driving force is negative.

2. A vehicle speed control system comprising:
   a speed setting section for setting a command vehicle speed;
   a vehicle speed sensing section for sensing an actual vehicle speed;
   a driving force calculating section for calculating a command driving force required to make the actual vehicle speed equal to the command vehicle speed;
   an engine output calculating section for calculating a command engine output in accordance with the command driving force and the command vehicle speed;
   a discriminating section for examining the command driving force to determine whether the command driving force is negative or not:
   a command engine speed calculating section for storing a predetermined engine torque versus speed characteristic relationship in a first state of fully closed throttle condition and fuel cutoff inhibiting condition and for calculating a command engine speed corresponding to the command engine output, from the predetermined engine torque versus speed characteristic relationship in the first state when the command driving force is negative; a
   torque/ratio calculating section for calculating a command engine torque and a command transmission ratio to achieve the command driving force, the torque/ratio calculating section calculating the command transmission ratio in accordance with the command engine speed;
   a transmission controlling section for controlling a continuously variable transmission in response to the command transmission ratio, the transmission controlling section controlling the continuously variable transmission in response to the command transmission ratio when the command driving force is negative; and
   an engine controlling section for controlling an engine in response to the command engine torque, wherein, when the command driving force is negative, the engine controlling section sets an engine operating state in one of the first state of the fully closed throttle condition and the fuel cutoff inhibiting condition, and a second state of the fully closed throttle condition and a fuel cutoff condition, the engine controlling section selecting, as a selected engine constraint state, one of the first and second states, and switching the engine operating state between the first and second states in accordance with the command engine output.

3. The vehicle speed control system according to claim 2, wherein the command engine speed calculating section includes a map for storing the predetermined engine torque versus speed characteristic relationship in the first state, as a first engine torque versus speed characteristic relationship, and a second engine torque versus speed characteristic relationship in the second state of the fully closed throttle condition and the fuel cutoff condition, and the command engine speed calculating section is configured to calculate the command engine speed by using the first engine torque versus speed characteristic relationship when the command output is equal to or greater than a predetermined level and by using the second engine torque versus speed characteristic relationship when the command output is smaller than the predetermined level.

4. A vehicle speed control system comprising:
   a speed setting section for setting a command vehicle speed;
   a vehicle speed sensing section for sensing an actual vehicle speed;
   a driving force calculating section for calculating a command driving force required to make the actual vehicle speed equal to the command vehicle speed;
   an engine output calculating section for calculating a command engine output in accordance with the command driving force and the command vehicle speed;
   a command engine speed calculating section for storing a predetermined engine torque versus speed characteristic relationship in a first state of fully closed throttle condition and fuel cutoff inhibiting condition and for calculating a command engine speed corresponding to the command engine output, from the predetermined engine torque versus speed characteristic relationship in the first state when the command driving force is negative;

a torque/ratio calculating section for calculating a command engine torque and a command transmission ratio to achieve the command driving force, the torque/ratio calculating section calculates the command transmission ratio in accordance with the command engine speed;

a transmission controlling section for controlling a continuously variable transmission in response to the command transmission ratio, the transmission controlling section controlling the continuously variable transmission in response to the command transmission ratio when the command driving force is negative; and an engine controlling section for controlling an engine in response to the command engine torque, wherein, when the command driving force is negative, the engine controlling section sets an engine operating state in one of the first state of the fully closed throttle condition and the fuel cutoff inhibiting condition, and a second state of the fully closed throttle condition and a fuel cutoff condition, the engine controlling section selecting, as a selected engine constraint state, one of the first and second states, and switching the engine operating state between the first and second states in accordance with an engine speed.

5. The vehicle speed control system according to claim 4, wherein the control system further comprises an engine speed sensor for sensing an actual engine speed;

the command engine speed calculating section includes a map for storing the predetermined engine torque versus speed characteristic relationship in the first state, as a first engine torque versus speed characteristic relationship, and a second engine torque versus speed characteristic relationship in the second state of the fully closed throttle condition and the fuel cutoff condition; and the command engine speed calculating section calculates the command engine speed by using the first engine torque versus speed characteristic relationship when the actual engine speed is equal to or lower than a predetermined first speed level and by using the second engine torque versus speed characteristic relationship when the actual engine speed is higher than a second speed level which is higher than the first speed level.

6. A vehicle speed control system comprising:

a speed setter for setting a command vehicle speed;

a vehicle speed sensor for sensing an actual vehicle speed;

an engine controlling device for controlling an engine of a vehicle in response to a command engine torque;

a transmission controlling device for controlling a continuously variable transmission in response to a command transmission ratio; and a controller for calculating a command driving force required to reduce a vehicle speed deviation of the actual vehicle speed from the command vehicle speed, for calculating a command engine output in accordance with the command driving force and the command vehicle speed, for calculating a command engine speed corresponding to the command engine output according to a predetermined engine torque-speed characteristic relationship in an engine constraint state of fully closed throttle condition and a fuel cutoff inhibit condition when the command driving force is negative, for further calculating the command transmission ratio in accordance with the command engine speed, for causing the engine controlling device to put the engine in the engine constraint state when the command driving force is negative and for causing the transmission controlling device to control the transmission in accordance with the command transmission ratio.

7. The vehicle speed control system according to claim 6 wherein the controller is configured to determine whether the command driving force is greater than zero, to determine the command engine speed which is equal to an engine speed value at an intersection point between a predetermined optimum fuel consumption line and a constant output line corresponding to the command engine output in an engine torque-speed graph when the command driving force is greater than zero, and to determine the command engine speed which is equal to an engine speed value at an intersection point between a constant output line corresponding to the command engine output and a predetermined engine torque line in the engine constraint state of the fully closed throttle condition and the fuel cutoff inhibiting condition in the engine torque-speed graph when the command driving force is smaller than zero.

8. The vehicle speed control system according to claim 6 wherein, when the driving force is negative, the controller changes over an engine operating state between a first constraint state for minimizing a throttle opening and inhibiting the fuel cutoff and a second constraint state for minimizing the throttle opening and permitting the fuel cutoff, in accordance with an engine operating parameter which is one of the command engine output and an engine speed.

9. The vehicle speed control system according to claim 8 wherein the controller compares the command engine output with a predetermined output value, and selects the first constraint state for inhibiting the fuel cutoff when the command output is greater than the predetermined output value and the second constraint state for performing the fuel cutoff when the command output is smaller than the predetermined output value.

10. The vehicle speed control system according to claim 8 wherein the control system further comprises an engine speed sensor for sensing an actual engine speed, the controller compares the actual engine speed with a predetermined speed value, and selects the first constraint state for inhibiting the fuel cutoff when the actual engine speed is lower than the predetermined speed value and the second constraint state for performing the fuel cutoff when the actual engine speed is higher than the predetermined speed value.

11. The vehicle speed control system according to claim 6, wherein the controller includes a map for storing the predetermined engine torque-speed characteristic relationship in the engine constraint state of the fully closed throttle condition, and the controller is configured to detect whether the command driving force is negative.

12. The vehicle speed control system according to claim 6, wherein the controller is configured to calculate the command driving force in accordance with the actual vehicle speed and the command vehicle speed.

13. The vehicle speed control system according to claim 12, wherein the controller is configured to calculate the command driving force by subtracting a vehicle running resistance estimated from the actual vehicle speed, from a driving force required to vary the actual vehicle speed to the command vehicle speed.

14. The vehicle speed control system according to claim 6, wherein the control system further comprises an input device for producing a brake application signal in response to a driver's brake operation, and the controller causes the engine controlling device to put the engine in the engine constraint state when the command driving force is negative and the brake application signal is absent.

15. A vehicle speed control system comprising:

a speed setter for setting a command vehicle speed;

a vehicle speed sensor for sensing an actual vehicle speed;

an engine controlling device for controlling an engine of a vehicle in response to a command engine torque;

a transmission controlling device for controlling a continuously variable transmission in response to a command transmission ratio; and a controller for calculating a command driving force required to reduce a vehicle speed deviation of the actual vehicle speed from the command vehicle speed, for calculating a command engine output in accordance with the command driving force and the command vehicle speed, for calculating a command engine speed corresponding to the command engine output according to a predetermined engine torque-speed characteristic relationship in an engine constraint state of fully closed throttle condition and a fuel cutoff inhibit condition when the command driving force is negative, for further calculating the command transmission ratio in accordance with the command engine speed, for causing the engine controlling device to put the engine in the engine constraint state when the command driving force is negative and for causing the transmission controlling device to control the transmission in accordance with the command transmission ratio, wherein the command engine output is proportional to a product of the command driving force and the command vehicle speed, and the command engine speed increases as the command output decreases when the command driving force is negative.

16. The vehicle speed control system according to claim 15 wherein the controller determines the command transmission ratio in accordance with the command engine speed and the actual vehicle speed so that the command transmission ratio is proportional to a quotient obtained by dividing the command engine speed by the actual vehicle speed, and the controller further determines a command engine torque in accordance with the command driving force and the command transmission ratio so that the command engine torque is proportional to a quotient obtained by dividing the command driving force by the command transmission ratio.

17. A vehicle speed control method comprising:

a speed setting step for setting a command vehicle speed;

a vehicle speed sensing step for sensing an actual vehicle speed;

a driving force calculating step for calculating a command driving force required to make the actual vehicle speed equal to the command vehicle speed;

an engine output calculating step for calculating [an] a command engine output in accordance with the command driving force and the command vehicle speed;

a discriminating step for examining the command driving force to determine whether the command driving force is negative;

a command engine speed calculating step for storing a predetermined engine-torque-versus-engine-speed characteristic relationship in an engine constraint state in which a throttle is fully closed and fuel cutoff is inhibited and for calculating a command engine speed corresponding to the command engine output, from the predetermined engine torque-versus-engine-speed characteristic relationship in the engine constraint state when the command driving force is negative;

a transmission ratio calculating step for calculating a command transmission ratio in accordance with the command engine speed;

an engine controlling step for putting an engine in the engine constraint state when the command driving force is negative; and a transmission controlling step for controlling a continuously variable transmission in response to the command transmission ratio when the command driving force is negative.

18. The vehicle speed control method according to claim 17, wherein the control method further comprises a checking step for canceling an automatic vehicle speed control when a driver's brake operation is detected, and allowing the driving force calculating step, the driving force calculating step and the engine speed calculating step to be performed only when the automatic vehicle speed control is not canceled in the absence of a driver's brake operation.

19. The vehicle speed control method according to claim 17 wherein the engine speed calculating step comprises a comparing step for determining whether the command driving force is equal to or greater than zero, a first calculating step for calculating the command engine speed corresponding to the command engine output, from a predetermined engine torque-versus-speed characteristic relationship for achieving an optimum fuel consumption when the command driving force is positive, and a second calculating step for calculating the command engine speed corresponding to the command engine output, from the predetermined engine torque-versus-speed characteristic relationship for minimizing a throttle opening and inhibiting the fuel cutoff when the command driving force is negative.

* * * * *